United States Patent
Gruber et al.

(10) Patent No.: US 8,936,005 B2
(45) Date of Patent: Jan. 20, 2015

(54) METHOD FOR OPERATING A STATIONARY POWER GENERATING PLANT

(71) Applicant: GE Jenbacher GmbH & Co OG, Jenbach (AT)

(72) Inventors: Friedrich Gruber, Hippach (AT); Guenther Wall, Bad Haering (AT)

(73) Assignee: GE Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 14/147,850

(22) Filed: Jan. 6, 2014

(65) Prior Publication Data

US 2014/0116362 A1    May 1, 2014

Related U.S. Application Data

(63) Continuation of application No. PCT/AT2012/000188, filed on Jul. 13, 2012.

(30) Foreign Application Priority Data

Jul. 20, 2011    (AT) ................................. A 1065/2011

(51) Int. Cl.
*F02B 19/00*    (2006.01)
*F02M 27/00*    (2006.01)
(Continued)

(52) U.S. Cl.
CPC ................ *F02M 27/00* (2013.01); *F02B 19/10* (2013.01); *F02M 21/0227* (2013.01);
(Continued)

(58) Field of Classification Search
CPC ...... F02B 19/1095; F02B 43/10; F02B 65/00; F02B 19/1023; F02C 5/02

USPC .............................. 123/3, 525, 253, 260, 275
See application file for complete search history.

(56) References Cited

U.S. PATENT DOCUMENTS 4,246,757 A * 1/1981 Heberling ........................ 60/737
4,663,938 A * 5/1987 Colgate ........................... 60/620
(Continued)

FOREIGN PATENT DOCUMENTS

EP    2 246 551    11/2010
EP    2 402 582    1/2012
(Continued)

OTHER PUBLICATIONS

International Search Report (ISR) issued Dec. 17, 2012 in International (PCT) Application No. PCT/AT2012/000188.
(Continued)

*Primary Examiner* — Noah Kamen
*Assistant Examiner* — Long T Tran
(74) *Attorney, Agent, or Firm* — Wenderoth, Lind & Ponack, L.L.P.

(57) ABSTRACT

A method for operating a stationary power generating plant, comprising a gas engine with at least one pre-chamber and at least one main combustion chamber, wherein the stationary power generating plant is fed a gas stream—in particular a substantially continuous gas stream—which comprises a hardly inflammable gas, wherein the gas stream is divided in the stationary power generating plant into a main stream and a partial stream, wherein the main stream is fed to the at least one main combustion chamber and wherein the partial stream is treated to increase its inflammability and is fed to the at least one pre-chamber of the gas engine, and also a stationary power generating plant with a gas engine.

24 Claims, 6 Drawing Sheets

Figure 1:
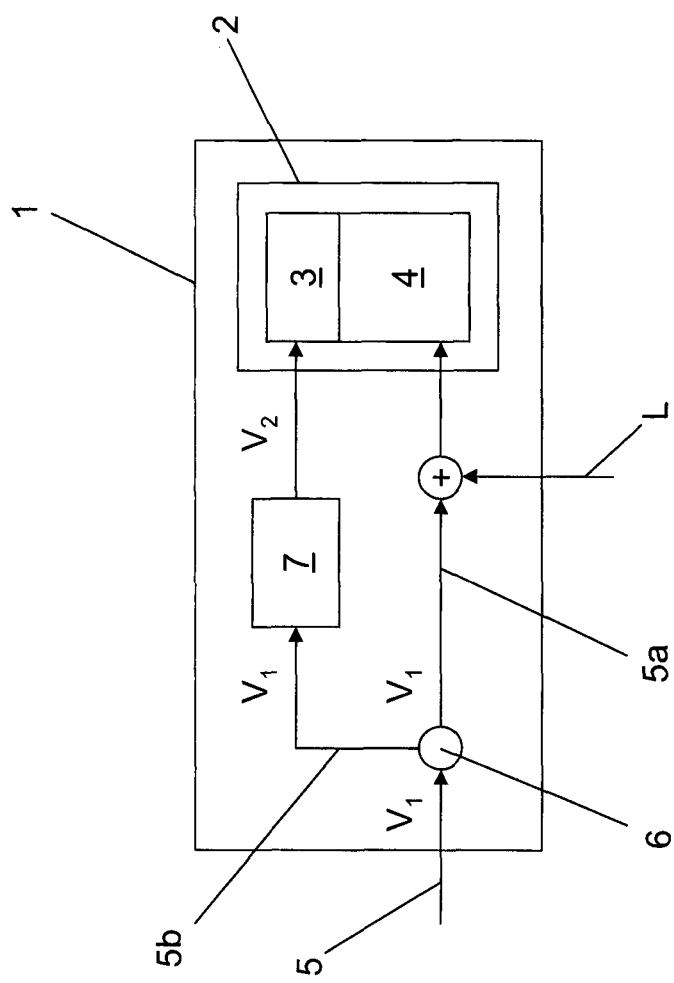

(51) Int. Cl.
*F02B 19/10* (2006.01)
*F02M 21/02* (2006.01)
*F02D 29/06* (2006.01)
*F02D 19/02* (2006.01)

(52) U.S. Cl.
CPC .......... *F02D 29/06* (2013.01); *F02M 21/0215* (2013.01); *F02D 19/022* (2013.01); *Y02T 10/125* (2013.01); *Y02T 10/32* (2013.01)
USPC ................................ 123/253; 123/3; 123/525

(56) References Cited

U.S. PATENT DOCUMENTS

| | | | |
|---|---|---|---|
| 6,684,640 B2 * | 2/2004 | McMillan et al. | 60/737 |
| 6,736,118 B1 * | 5/2004 | Velke | 123/550 |
| 7,743,753 B2 * | 6/2010 | Fiveland et al. | 123/543 |
| 8,215,949 B2 * | 7/2012 | Toqan | 431/4 |
| 2007/0209642 A1 | 9/2007 | Schmidt | |
| 2009/0274985 A1 * | 11/2009 | McKnight et al. | 431/36 |
| 2011/0308495 A1 | 12/2011 | Furukawa | |
| 2013/0055984 A1 * | 3/2013 | Snell | 123/25 R |

FOREIGN PATENT DOCUMENTS

| | | |
|---|---|---|
| WO | 2008/106722 | 9/2008 |
| WO | 2010/103778 | 9/2010 |

OTHER PUBLICATIONS

Austrian Patent Office Search Report (ASR) issued Nov. 18, 2011 in Austrian Patent Application No. A 1065/2011.

C. Heinz et al., "The chamber ignition concepts for stationary large gas engines", vol. 73, No. 1, MTZ paper pp. 76-81, ISSN No. 0024-8525, EPA XP-001571613, Jan. 1, 2012, together with English abstract.

* cited by examiner

METHOD FOR OPERATING A STATIONARY POWER GENERATING PLANT

The invention concerns a method of operating a stationary power generating plant including a gas engine with at least one pre-chamber and at least one main combustion chamber, wherein the stationary power generating plant is fed with an—in particular substantially continuous—gas flow which includes a low-flammability gas, and a stationary power generating plant in which the proposed method is used.

Low-flammability gases are frequently also referred to as Low BTU (British thermal unit) gases. Frequently these involve gases or gas mixtures with a low calorific value which for example is only a third or half of the calorific value of methane. Such gases are for example associated accompanying gases which occur in crude oil production or gases from low-methane natural gas sources. In particular the term low-flammability gas is used to denote a gas with a volume-related calorific value of less than 22.3 megajoules per normal cubic meter ($MJ/Nm^3$). In comparison therewith a typical natural gas of quality category H has a volume-related calorific value of about 37 $MJ/Nm^3$.

Because of their low calorific value, low-flammability gases often have an excessively low flammability or ignition quality so that they are not suitable for direct operation of an internal combustion engine. Thus for example US 2007/0209642 A1 discloses a power generating plant to which a low BTU gas is fed, wherein an amount of air which is lower for such a gas in relation to gases of higher calorific value is fed in a gas mixer to the gas flow fed to the power generating plant in order to set a suitable air-fuel ratio for operation of an internal combustion engine of the power generating plant.

The object of the invention is to provide a method which is improved over the state of the art and an improved stationary power generating plant, by which operation of an internal combustion engine of the stationary power generating plant, in particular a gas engine, is made possible with a gas flow fed to the stationary power generating plant, which includes a low-flammability gas.

In the proposed method according to the invention that object is attained in that in the stationary power generating plant the gas flow is divided into a main flow and into a sub-flow, wherein the main flow is fed to the at least one main combustion chamber and wherein the sub-flow is treated to increase flammability and is fed to the at least one pre-chamber of the gas engine.

In a stationary power generating plant of the general kind set forth, to attain that object, it is provided according to the invention that the stationary power generating plant includes a distributing device by which the gas flow can be divided into a main flow and a sub-flow, wherein the main flow can be fed to the at least one main combustion chamber and the sub-flow can be fed to at least one gas treatment device, wherein the flammability of the sub-flow can be increased by the at least one gas treatment device, wherein the sub-flow treated by the at least one gas treatment device can be fed to the at least one pre-chamber of the gas engine.

An advantage of the proposed method is that only a part of the gas flow fed to the stationary power generating plant is treated to increase flammability. That treated sub-flow has a flammability or ignition quality which is increased in comparison with the gas flow and is fed to the pre-chambers of the gas engine. The increased flammability of the sub-flow in the pre-chambers makes its possible for the main combustion chambers of the gas engine to be operated with the main flow which was not processed by the gas treatment operation. The small amount of treated gas for a pre-chamber is sufficient to reliably ignite the non-treated gases in the main combustion chamber associated with the pre-chamber. It can preferably be provided in that respect that at a maximum 5%, preferably at a maximum 2%, is branched from the gas flow as the sub-flow.

According to a preferred embodiment it can be provided that the stationary power generating plant is fed with a gas flow which has a first laminar flame speed which is less than or equal to 15 cm/s, preferably less than or equal to 12 cm/s, particularly preferably less than or equal to 10 cm/s, with a combustion air ratio of 1.

The degree of flammability of a gas can be specified by the laminar flame speed of the gas. As described in the relevant literature, the laminar flame speed of a gas or a gas mixture is the speed at which the flame of the ignited gas or gas mixture propagates normal relative to the flame front relative to the unburnt gas or gas mixture. In accordance with the invention a low-flammability gas is interpreted as being a gas or gas mixture having a low laminar flame speed, in particular a gas or gas mixture having a laminar flame speed of less than 15 cm/s under normal conditions as described in the relevant literature, that is to say for example with a combustion air ratio of 1 and at atmospheric pressure.

Methods for determining the laminar flame speed of a gas are known in the state of the art, like for example by known experimental methods like the Bunsen burner method or the flat flame method. In addition the man skilled in the art also knows of numerical calculation methods by which the laminar flame speed of a gas can be calculated from its gas composition. The gas components which substantially determine the laminar flame speed of a gas are methane and carbon dioxide. Measured values of the methane and carbon dioxide concentrations in the gas flow can be used as a basis for calculation of the laminar flame speed. The gas composition of the substantially continuous gas flow is in that case typically not subjected to major fluctuations, in particular if the gas flow originates from a gas source of crude oil production.

To increase the flammability of the sub-flow it can preferably be provided that by the gas treatment of the sub-flow the laminar flame speed of the sub-flow is increased to a second laminar flame speed which is greater than the laminar flame speed prior to the gas treatment. In that way by the gas treatment of the sub-flow the second laminar flame speed of the sub-flow can be increased to a value greater than 10 cm/s, preferably greater than 30 cm/s, with a combustion air ratio of 1.

In principle devices known in the state of the art can be used for the gas treatment of the sub-flow. Thus a reforming device can be used for the gas treatment of the sub-flow, in which case the sub-flow is enriched with hydrogen by the reforming device.

For the gas treatment of the sub-flow it is also possible to use a separating device, in which case an inert gas, preferably carbon dioxide, is separated from the sub-flow by the separating device. Such a separating device can be for example a membrane or an amine scrubber. The separated inert gas can be fed to the main flow to avoid emission of the inert gas to the environment.

It can further be provided that a water electrolysis device is used for the gas treatment of the sub-flow, wherein the sub-flow is enriched with hydrogen by the water electrolysis device. It is particularly advantageous in that respect if the gas engine is connected to a generator, wherein the generator delivers electric power, wherein a part of the delivered electric power is fed to the water electrolysis device. The oxygen which is produced in water electrolysis can in that case be fed to the air flow which is usually fed to the main flow prior to introduction into the main combustion chambers of the gas engine. In that way the required air flow amount can be reduced, with the same combustion air ratio.

In a particularly preferred embodiment of the invention it can be provided that prior to division into the main flow and into the sub-flow the gas flow is processed in a gas preparation step, wherein by the gas preparation step an inert gas, preferably carbon dioxide, is separated from the gas flow or is fed to the gas flow. In that case by the gas preparation step an inert gas, preferably carbon dioxide, can be fed to the gas flow if the first laminar flame speed is greater than 10 cm/s or by the gas preparation step an inert gas, preferably carbon dioxide, can be separated from to the gas flow if the first laminar flame speed is less than 10 cm/s.

In order in particular to be able to feed a gas of substantially constant flammability to the main combustion chambers of a gas engine a particularly advantageous embodiment is one in which the gas flow fed to the stationary power generating plant is set or regulated by the gas preparation step to a laminar main flow flame speed. In that case by the gas preparation step the laminar main flow flame speed can be set or regulated to a value of between 10 cm/s and 15 cm/s, preferably between 10 cm/s and 12 cm/s, at a combustion air ratio of 1. It has proven to be particularly advantageous in that respect if upon a deviation of the laminar main flow flame speed from a reference value by the gas preparation step an inert gas, preferably carbon dioxide, is separated from the gas flow or is fed to the gas flow so that the laminar main flow flame speed is reset to the reference value. By virtue of regulating the flammability of the main flow to a substantially constant laminar main flow flame speed the gas engine is exposed to no substantial fluctuations in the gas quality fed to it. That has the advantage that the gas engine runs overall more stably and the engine management needs to intervene more rarely. In that way the gas engine can also be operated closer to knocking or misfire limits, which is advantageous especially with modern high-power engines.

The object of the present invention is also attained by a stationary power generating plant having the features of claim 16. Advantageous developments of that stationary power generating plant are set forth by the claims appended thereto.

Further details and advantages of the present invention are described by means of the specific description hereinafter. In the drawing:

FIG. 1 shows a diagrammatic block circuit diagram of an embodiment of the proposed stationary power generating plant, and FIGS. 2 through 6 show further examples of proposed stationary power generating plants with different embodiments of a gas preparation device in the form of diagrammatic views.

FIG. 1 shows a diagrammatic view of a stationary power generating plant 1 which includes a gas engine 2 having a pre-chamber 3 and a main combustion chamber 4. The stationary power generating plant 1 is fed with a substantially continuous gas flow 5 which includes a low-flammability gas. The gas flow 5 has a first laminar flame speed $V_1$. Within the stationary power generating plant 1 the gas flow 5 is fed to a distributing device 6 which divides the gas flow 5 into a main flow 5a and a sub-flow 5b. In the illustrated example one percent of the gas flow 5 is branched from the gas flow 5 in the form of a sub-flow 5b by the distributing device 6. The remaining 99% of the gas flow 5 forms the main flow 5a which after the feed of air L is fed to the main combustion chamber 4 of the gas engine 2.

The sub-flow 5b is fed to a gas treatment device 7. The flammability of the sub-flow 5b is increased in the gas treatment device 7. The increase in the flammability of the sub-flow 5b can be implemented for example by the at least one gas treatment device 7 being in the form of a reforming device, wherein the sub-flow 5b can be enriched with hydrogen by the reforming device. It can however also be provided that the at least one gas treatment device 7 is in the form of a separating device, wherein an inert gas, preferably carbon dioxide, can be separated from the sub-flow 5b by the separating device. In addition the at least one gas treatment device 7 can be in the form of a water electrolysis device, wherein the sub-flow 5b can be enriched with hydrogen by the water electrolysis device. It is particularly advantageous in that respect if the gas engine 2 is connected to a generator, the generator delivering electric power, wherein a part of the delivered electric power can be fed to the water electrolysis device.

After the gas treatment device 7 the sub-flow 5b has a second laminar flame speed $V_2$, the second laminar flame speed $V_2$ being greater than the first laminar flame speed $V_1$ of the sub-flow 5b prior to the gas treatment device 7. Preferably the second laminar flame speed $V_2$ of the gas treatment device 7 is of a value of greater than 10 cm/s, preferably greater than 30 cm/s, with a combustion air ratio of 1.

Figure 2:
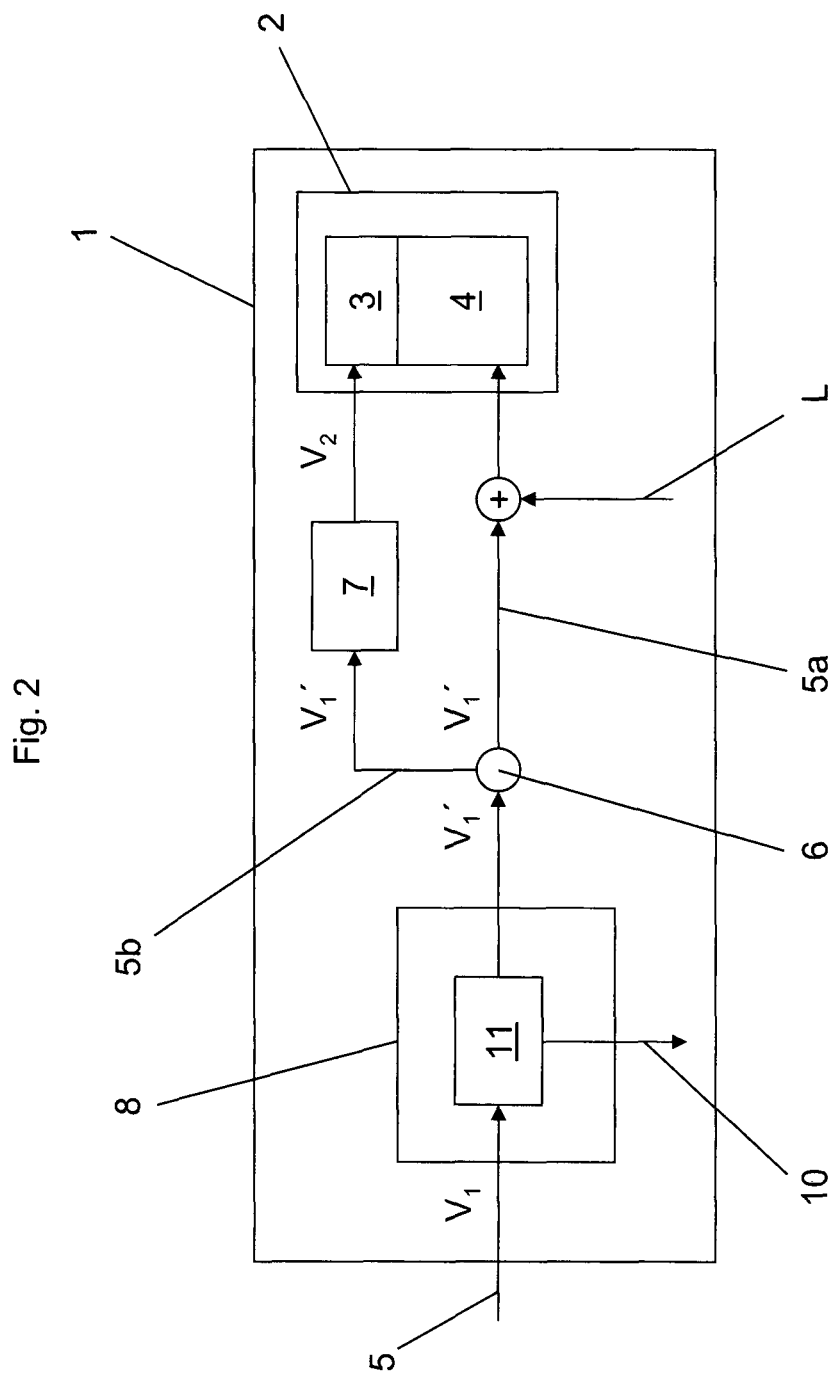

FIG. 2 shows a stationary power generating plant 1 as shown in FIG. 1, wherein connected upstream of the distributing device 6 is a gas preparation device 8 by which an inert gas 10, for example carbon dioxide, is separated from the gas flow 5. For that purpose the gas preparation device 8 includes a membrane 11, through which the gas flow 5 is passed, wherein the inert gas 10 occurs as the retentate and is discharged for example to the atmosphere. Instead of the membrane 11 the gas preparation device 8 can also include devices which make it possible to separate inert gas constituents of the gas flow 5, like for example an amine scrubber. By virtue of separating the inert gas 10 from the gas flow 5, the gas flow 5 downstream of the gas preparation device 8 involves a laminar main flow flame speed $V_1'$ which is greater than the first laminar flame speed $V_1$ upstream of the gas preparation device 8. That kind of gas preparation is important in particular when the flammability of the gas flow 5 is so low that ignition in the main combustion chamber 4 of the gas engine would not be possible.

Figure 3:
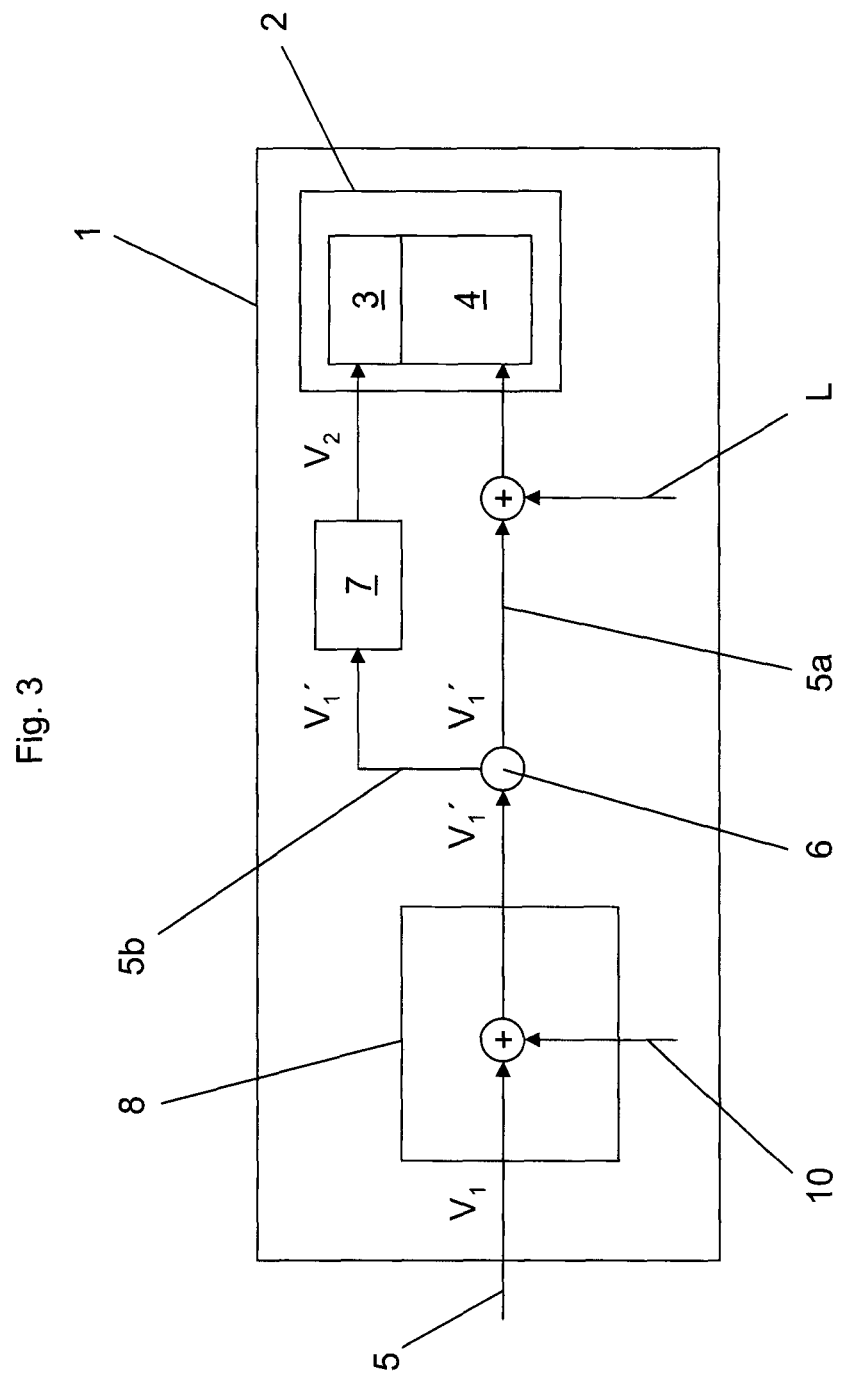

FIG. 3 shows a diagrammatic view of a stationary power generating plant 1 which includes a gas preparation device 8. In this case an inert gas 10, for example carbon dioxide or nitrogen, is fed to the gas flow 5 in the gas preparation device 8 to reduce the laminar flame speed of the gas flow 5 to a laminar main flame speed $V_1'$. That kind of gas preparation can be used when the flammability of the gas flow 5 fed to the stationary power generating plant 1 increases during operation of the gas engine 2 so that a main flow 5a involving a substantially constant flammability or a substantially constant laminar main flame speed $V_1'$ is fed to the main combustion chamber 4 of the gas engine 2 by that reduction in flammability.

Figure 4:
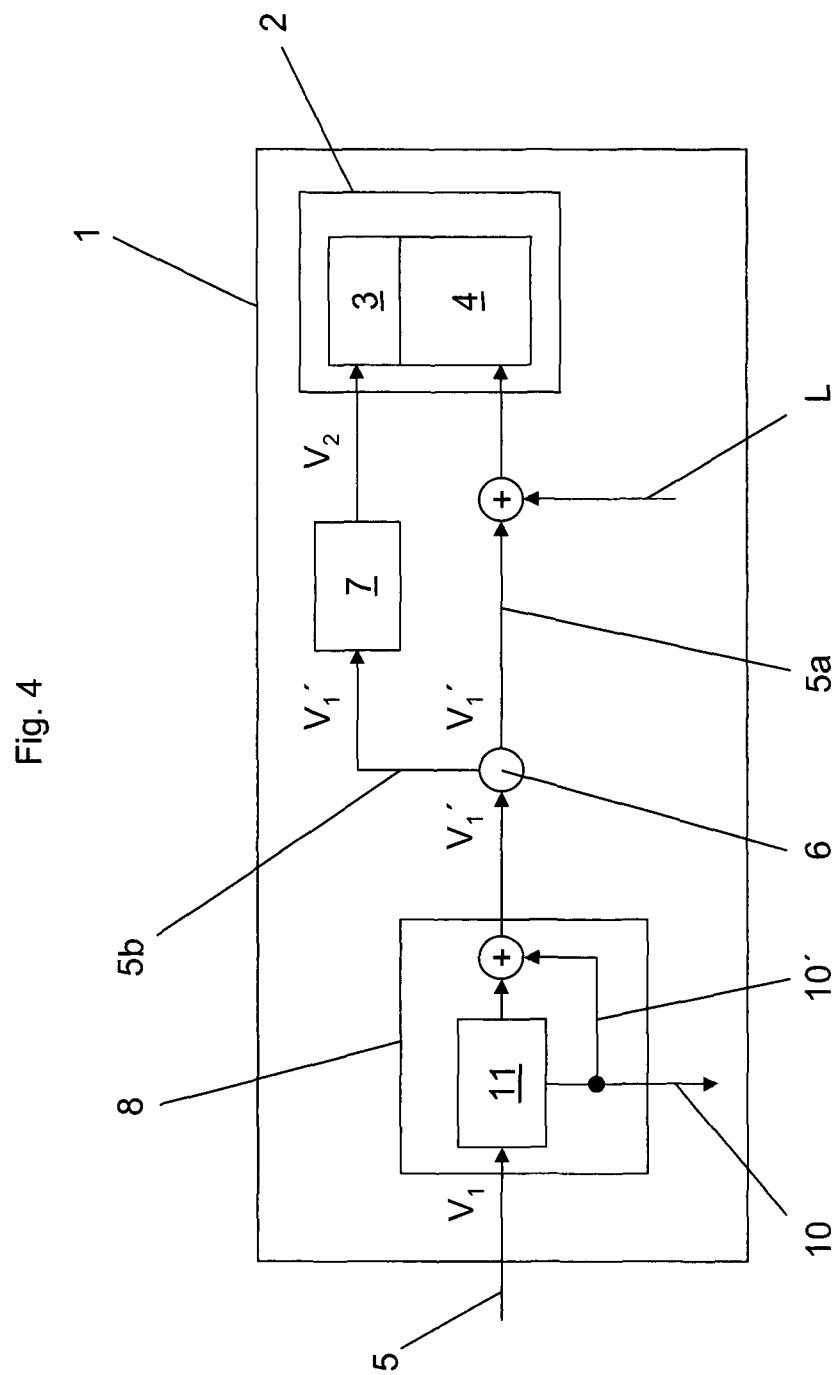

FIG. 4 shows a stationary power generating plant 1 as shown in FIG. 2, wherein in this example a partial amount 10' of the inert gas 10 separated off by the membrane 11 is fed to the gas flow 5 again. A membrane 11 or an amine scrubber of a gas preparation device 8 is often set to the worst gas quality to be expected, in the sense of flammability of the gas flow 5. If now the flammability of the continuously fed gas flow 5 was to be increased then the flammability of the gas flow 5 can be adjusted to a desired laminar main flow flame speed $V_1'$ by the feed of a partial amount 10' of the initially separated-off inert gas 10 to the gas flow 5.

Figure 5:
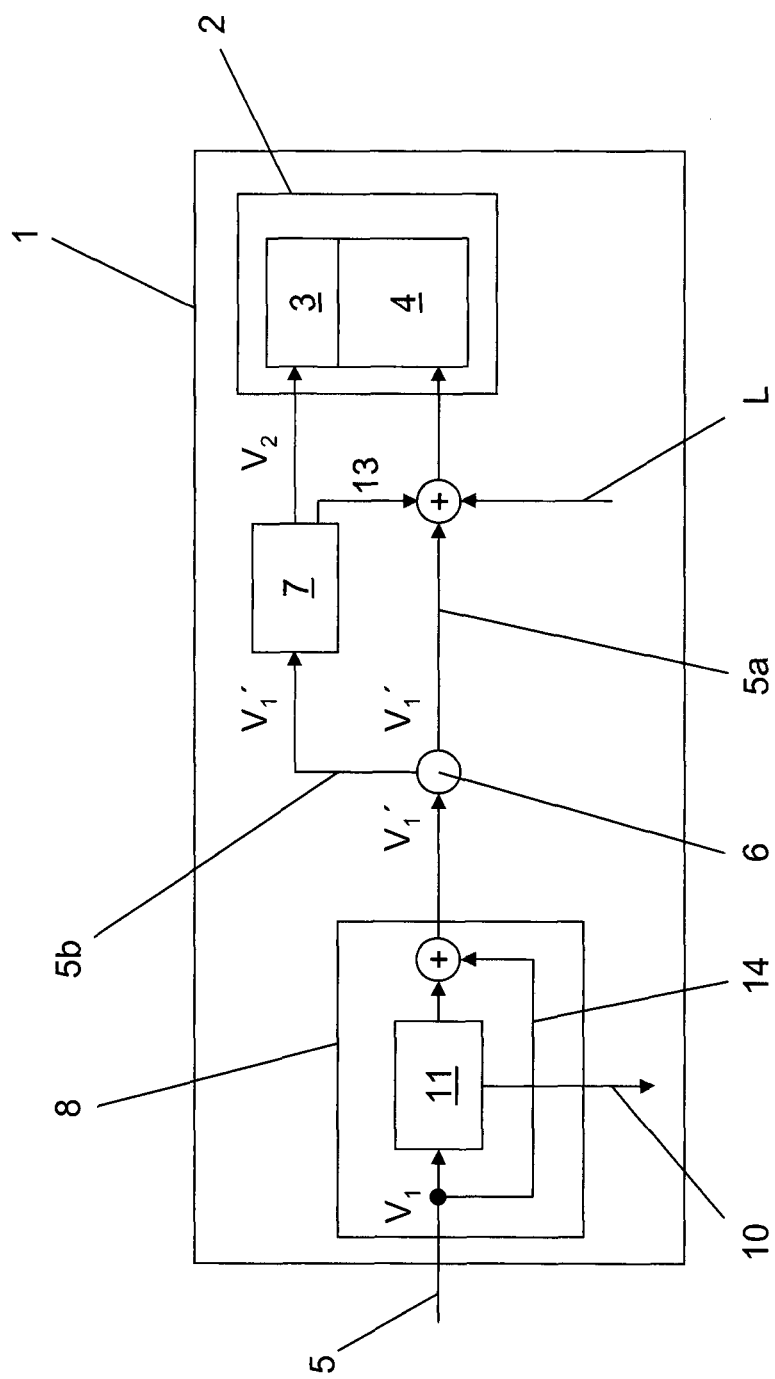

FIG. 5 shows a stationary power generating plant 1 as shown in FIG. 4, wherein in this example a partial amount 14 of the gas flow 5 fed to the stationary power generating plant is fed to the gas flow 5 after passing through the gas preparation device 8 through a bypass. By regulating or controlling the supplied partial amount 14, upon fluctuations in the gas quality the flammability of the gas flow 5 can be adjusted to a desired laminar main flow flame speed $V_1'$. In the case of very slow changes in the gas quality, in the sense of flammability of the gas flow 5, it can also be provided that the mode of operation of the gas preparation device 8 is regulated or controlled. In the case of a gas preparation device 8 with an amine scrubber for example the fluid through-put through the amine scrubber can be suitably regulated or controlled. In addition in this example the retentate 13 which is separated off in the gas treatment device 7 which is in the form of the membrane, for example carbon dioxide, is fed to the main flow 5a. As the retentate 13 only involves comparatively small amounts, it can be fed to the main flow 5a without any problem, instead of being discharged to the environment.

Figure 6:
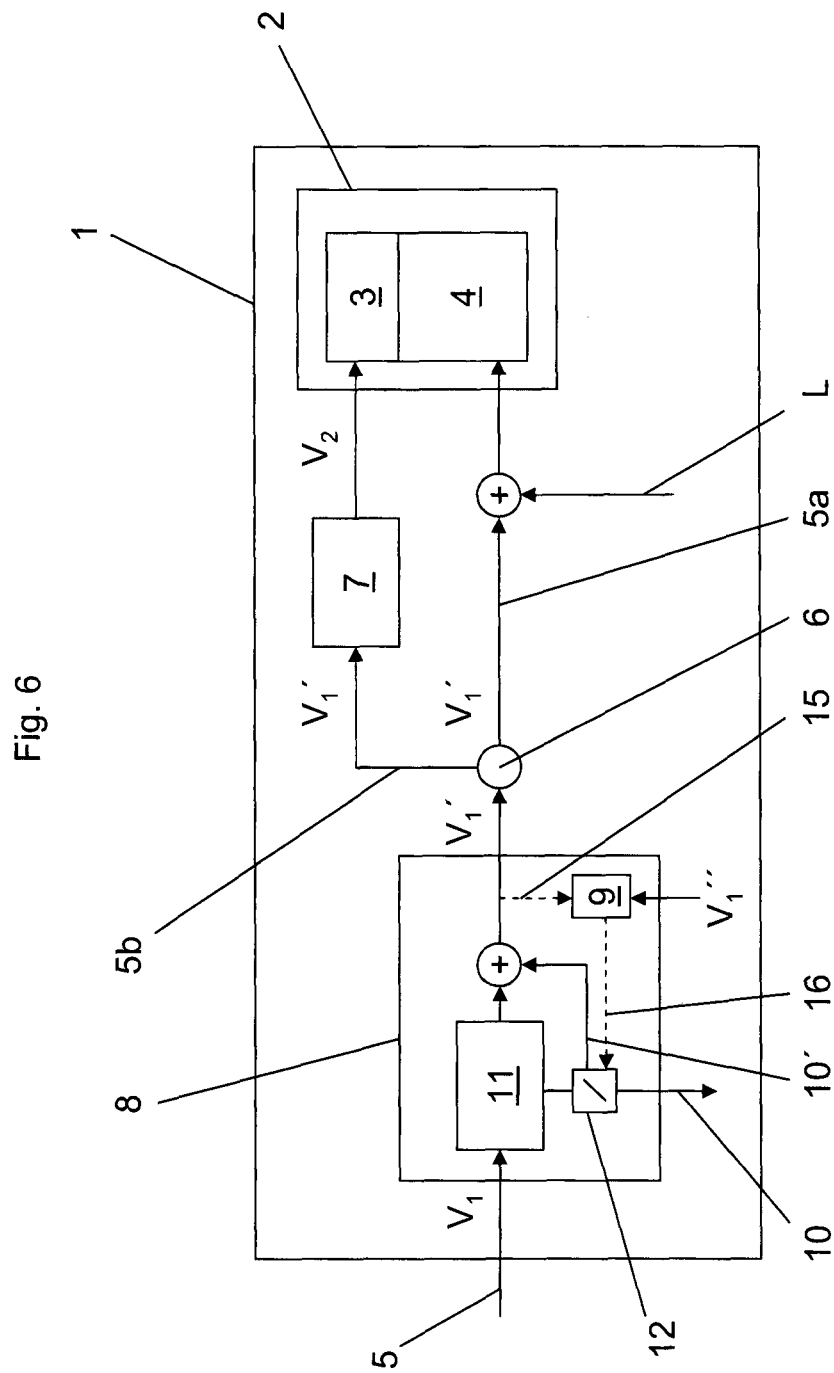

FIG. 6 shows a stationary power generating plant 1 as shown in FIG. 4, wherein the gas preparation device 8 includes a regulating device 9, by which the gas flow 5 can be regulated to a laminar main flow flame speed $V_1'$, wherein to regulate the laminar main flow flame speed $V_1'$ to a predeterminable reference value $V_1''$ the amount 10' of inert gas 10, preferably carbon dioxide, which can be separated from the gas flow 5 by the gas preparation device 8 or which can be fed to the gas flow 5 can be regulated by way of the regulating device 9. The actual value of the laminar main flow speed $V_1'$ is periodically or continuously ascertained and signaled to the regulating device 9. The ascertaining operation can be effected for example by calculation programs or tables, by which the laminar main flow speed $V_1'$ can be ascertained from a detected gas composition of the gas flow 5 or by experimental methods like for example the Bunsen burner method. Signaling of the ascertained laminar main flow speed $V_1'$ to the regulating device 9 is indicated by the broken-line arrow 15. In dependence on the deviation of the laminar main flow flame speed $V_1'$ from the reference value $V_1''$ actuation of a regulatable valve 12 is effected (indicated by the broken-line arrow 16), by which the amount 10', that is to be fed to the gas flow 5, of the inert gas 10 separated off by the membrane 11 is controlled, so that the laminar main flow flame speed $V_1'$ follows the setpoint value $V_1''$.

The invention claimed is:

1. A method of operating a stationary power generating plant including a gas engine with at least one pre-chamber and at least one main combustion chamber, wherein the stationary power generating plant is fed with an—in particular substantially continuous—gas flow which includes a low-flammability gas, characterised in that in the stationary power generating plant the gas flow is divided into a main flow and into a sub-flow, wherein the main flow is fed to the at least one main combustion chamber and wherein the sub-flow is treated to increase flammability and is fed to the at least one pre-chamber of the gas engine.

2. A method as set forth in claim 1 characterised in that the stationary power generating plant is fed with a gas flow which has a first laminar flame speed which is less than or equal to 15 cm/s, preferably less than or equal to 12 cm/s, particularly preferably less than or equal to 10 cm/s, with a combustion air ratio of 1.

3. A method as set forth in claim 1 characterised in that prior to division into the main flow the gas flow is processed in a gas preparation step, wherein by the gas preparation step an inert gas, preferably carbon dioxide, is separated from the gas flow or is fed to the gas flow.

4. A method as set forth in claim 3 characterised in that by the gas preparation step an inert gas, preferably carbon dioxide, is fed to the gas flow if the first laminar flame speed is greater than 10 cm/s.

5. A method as set forth in claim 3 characterised in that by the gas preparation step an inert gas, preferably carbon dioxide, is fed to the gas flow if the first laminar flame speed is less than 10 cm/s.

6. A method as set forth in claim 3 characterised in that the gas flow fed to the stationary power generating plant is set or closed-loop controlled by the gas preparation step to a laminar main flow flame speed.

7. A method as set forth in claim 6 characterised in that by the gas preparation step the laminar main flow flame speed is set or closed-loop controlled to a value of between 10 cm/s and 15 cm/s, preferably between 10 cm/s and 12 cm/s, at a combustion air ratio of 1.

8. A method as set forth in claim 6 characterised in that upon a deviation of the laminar main flow flame speed from a reference value by the gas preparation step an inert gas, preferably carbon dioxide, is separated from the gas flow or is fed to the gas flow so that the laminar main flow flame speed follows the flame speed setpoint value.

9. A method as set forth in claim 1 characterised in that at a maximum 5%, preferably at a maximum 2%, is branched from the main flow as the sub-flow.

10. A method as set forth in claim 1 characterised in that by the gas treatment of the sub-flow the laminar flame speed of the sub-flow is increased to a second laminar flame speed which is greater than the laminar flame speed prior to the gas treatment.

11. A method as set forth in claim 10 characterised in that by the gas treatment of the sub-flow the second laminar flame speed of the sub-flow is increased to a value greater than 10 cm/s, preferably greater than 30 cm/s, with a combustion air ratio of 1.

12. A method as set forth in claim 1 characterised in that a reforming device is used for the gas treatment of the sub-flow, wherein the sub-flow is enriched with hydrogen by the reforming device.

13. A method as set forth in claim 1 characterised in that a separating device is used for the gas treatment of the sub-flow, wherein an inert gas, preferably carbon dioxide, is separated from the sub-flow by the separating device.

14. A method as set forth in claim 1 characterised in that a water electrolysis device is used for the gas treatment of the sub-flow, wherein the sub-flow is enriched with hydrogen by the water electrolysis device.

15. A method as set forth in claim 14 characterised in that the gas engine is connected to a generator, wherein the generator delivers electric power, wherein a part of the delivered electric power is fed to the water electrolysis device.

16. A stationary power generating plant comprising a gas engine which has at least one pre-chamber and at least one main combustion chamber, wherein the stationary power generating plant can be fed with an—in particular substantially continuous—gas flow which includes a low-flammability gas, characterised in that the stationary power generating plant includes a distributing device by which the gas flow can be divided into a main flow, wherein the main flow can be fed to the at least one main combustion chamber and the sub-flow can be fed to at least one gas treatment device, wherein the flammability of the sub-flow can be increased by the at least one gas treatment device, wherein the sub-flow treated by the at least one gas treatment device can be fed to the at least one pre-chamber of the gas engine.

17. A stationary power generating plant as set forth in claim 16 characterised in that connected upstream of the distributing device is a gas preparation device by which an inert gas, preferably carbon dioxide, can be separated from the gas flow or can be fed to the gas flow.

18. A stationary power generating plant as set forth in claim 17 characterised in that the gas preparation device includes a membrane or an amine scrubber.

19. A stationary power generating plant as set forth in claim 17 characterised in that the gas preparation device includes a control device by which the gas flow can be controlled to a laminar main flow flame speed, wherein to control the laminar main flow flame speed to a predeterminable setpoint value the amount of inert gas, preferably carbon dioxide, which can be separated from the gas flow or fed to the gas flow by the gas preparation device can be controlled.

20. A stationary power generating plant as set forth in claim 16 characterised in that after the at least one gas treatment device the treated sub-flow has a second laminar flame speed, wherein the second laminar flame speed is greater than the laminar flame speed of the sub-flow prior to the gas treatment device.

21. A stationary power generating plant as set forth in claim 16 characterised in that the at least one gas treatment device is in the form of a reforming device, wherein the sub-flow can be enriched with hydrogen by the reforming device.

22. A stationary power generating plant as set forth in claim 16 characterised in that the at least one gas treatment device is in the form of a separating device, wherein an inert gas, preferably carbon dioxide, can be separated from the sub-flow by the separating device.

23. A stationary power generating plant as set forth in claim 16 characterised in that the at least one gas treatment device is in the form of a water electrolysis device, wherein the sub-flow can be enriched with hydrogen by the water electrolysis device.

24. A stationary power generating plant as set forth in claim 23 characterised in that the gas engine is connected to a generator, wherein the generator delivers electric power, wherein a part of the delivered electric power can be fed to the water electrolysis device.

* * * * *